United States Patent
Mathews

(10) Patent No.: US 7,269,642 B2
(45) Date of Patent: Sep. 11, 2007

(54) CUSTOMIZING STRINGS DISPLAYED UPON A MOBILE DEVICE WITHOUT ALTERING CORE SOFTWARE OF THE DEVICE

(75) Inventor: Ajit Mathews, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 670 days.

(21) Appl. No.: 10/886,974

(22) Filed: Jul. 8, 2004

(65) Prior Publication Data

US 2006/0010132 A1    Jan. 12, 2006

(51) Int. Cl.
G06F 15/177    (2006.01)
G06F 7/00    (2006.01)

(52) U.S. Cl. .......................................... 709/221; 707/3

(58) Field of Classification Search ................ 709/221; 707/3
See application file for complete search history.

(56) References Cited

U.S. PATENT DOCUMENTS 5,758,286 A * 5/1998 Leppanen ................... 455/445
6,122,501 A * 9/2000 Gallant ..................... 455/414.1
6,584,613 B1 * 6/2003 Dunn et al. ................. 725/122
6,711,563 B1   3/2004 Koskas
2004/0049574 A1 * 3/2004 Watson et al. .............. 709/224

* cited by examiner

Primary Examiner—Krisna Lim

(57) ABSTRACT

A method for presenting text (50) upon a mobile device (10) can include the step of establishing a string associative table (20) within the mobile device (20). The string associative table (20) can be remote from core software (32) embedded within the mobile device (20). The string associative table (20) can be searched for a request identifier that identifies text (50) to be presented upon the mobile device (10). When the request identifier is found in the string associative table (20), a string (40) within the string associative table (20) corresponding to the request identifier can be identified and presented upon the mobile device (10) as text (50). When the request identifier is not found in the string associative table (20), a string (40) corresponding to the request identifier can be found within a core table (22) and presented upon the mobile device (10) as text (50).

25 Claims, 3 Drawing Sheets

CUSTOMIZING STRINGS DISPLAYED UPON A MOBILE DEVICE WITHOUT ALTERING CORE SOFTWARE OF THE DEVICE

BACKGROUND

1. Field of the Invention

The present invention relates to the field of mobile devices and, more particularly, to customizing strings displayed upon a mobile device over the air without altering core software of the device.

2. Description of the Related Art

Mobile telephony devices are feature rich devices that typically include a display area capable of presenting text to users. A number of textual presentations can appear within the display area. Many of these textual presentations can indicate an occurrence of an event within an operating system of the mobile device. Most mobile telephone devices define the strings for the presented text within the core software of the mobile device.

Carriers providing communication services for mobile telephone devices often require mobile devices to display carrier-specific messages for branding purposes. For example, one carrier may prefer a contact list to be labeled "contacts," another "phone book," yet another "dudes," and still another "directory." Presently, there is no method to customize or brand these strings without changing the strings within the core software. Even a single carrier may want to target different markets and use one specific message for one market segment (youth) and a different specific message to another market segment (business).

Notably, the core software within mobile devices is typically secured against external modifications to prevent tampering. Accordingly, manufactures must often brand and configure otherwise similar mobile devices for different carriers before shipping the devices. Further, retailers stock and sell many similar mobile devices, each configured for a designated carrier. Currently, there fails to exist a method or system of configuring mobile devices with carrier-specific strings after being distributed to customers and/or at the time of distribution to customers without altering the core software of the mobile device.

SUMMARY OF THE INVENTION

The present invention provides a method, a system, and an apparatus for updating operating system strings that are displayed as text upon a mobile device in accordance with the inventive arrangements disclosed herein. More specifically, the present invention includes a memory within a mobile device for storing a table that defines a plurality of strings, each associated with a string identification key. The table can be a redundant and preferred lookup table, where another lookup table that associates strings with string identification keys resides within the core software of the mobile device. The memory can be updated externally. Accordingly, strings corresponding to identification keys can be altered within the memory without altering the core software. Since the memory lookup table is preferred to the memory lookup table of the core software, strings within the memory are displayed within text fields of the mobile device responsive to event occurrences.

One aspect of the present invention can include a method for presenting text upon a mobile device. The method can include the step of establishing a string associative table within the mobile device. The string associative table can be remote from core software embedded within the mobile device. The string associative table can be searched for a request identifier that identifies text to be presented upon the mobile device. When the request identifier is found in the string associative table, a string within the string associative table corresponding to the request identifier can be identified and presented upon the mobile device as text. When the request identifier is not found in the string associative table, a string corresponding to the request identifier can be found within a core table and presented upon the mobile device as text.

It should be noted that the invention can be implemented as a program for controlling a mobile device to implement the functions and methods described herein, or a program for enabling a mobile device to perform the processes corresponding to the steps disclosed herein. This program may be provided by storing the program in a magnetic disk, an optical disk, a semiconductor memory, any other recording medium, or by accessing the program via a network.

Another aspect of the present invention can include a system for presenting strings upon a mobile device. The system can include a memory such as flash memory configured to store at least one string associative table, which can be wirelessly updatable. The system can also include core software embedded within the mobile device. The core software can include at least one core table. The string associative table and the core table can each associate a plurality of request identifiers with a plurality of strings to be presented upon the mobile device. Entries in the string associative table can override entries within the core table for string lookup purposes whenever a same request identifier exists within the string associative table and the core table. The request identifiers can be used by an operating system to indicate event occurrences.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate and explain various embodiments in accordance with the present invention; it being understood, however, that the invention is not limited to the precise arrangements and instrumentalities shown.

DETAILED DESCRIPTION OF THE INVENTION

Figure 1:
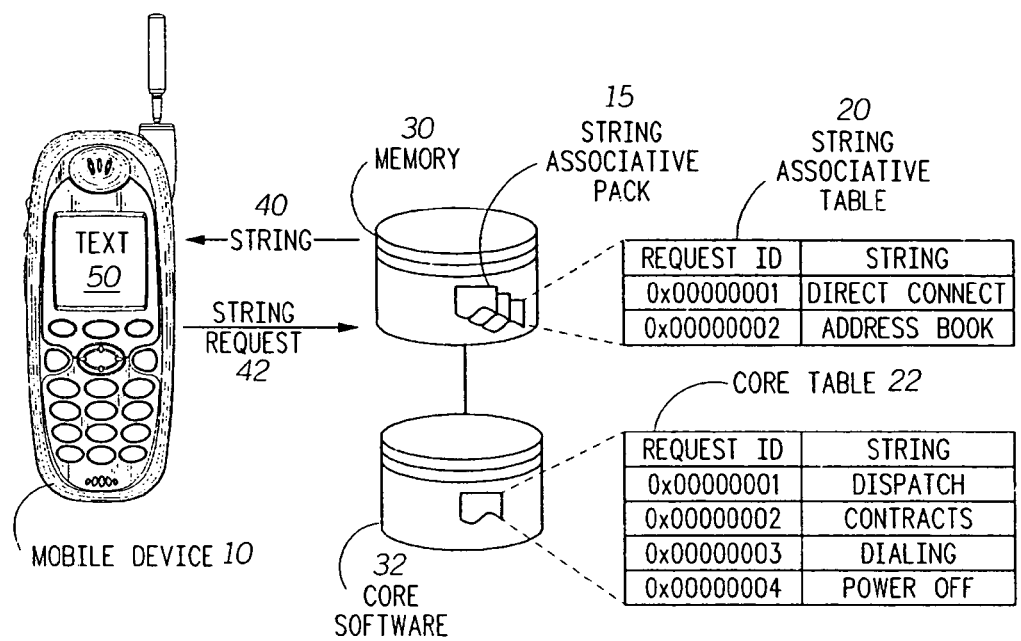
FIG. 1 is a schematic diagram illustrating a system for presenting strings upon a mobile device in accordance with an embodiment of the inventive arrangements disclosed herein.

FIG. 1 is a schematic diagram illustrating a system 100 for presenting strings upon a mobile device 10 in accordance with an embodiment of the inventive arrangements disclosed herein. The mobile device 100 can be any of a variety of mobile computing devices configured for mobile wireless communications. For example, the mobile device 10 can include, but is not limited to, a cellular telephone, a Personal Communications Service (PCS) telephone, a personal data assistant with mobile telephony communication capabilities, a two-way radio, and the like. Further, the mobile device 10 can communicate using a multitude of mobile telephony techniques including, but not limited to, Global System for Mobile Communications (GSM) techniques, Time Division Multiple Access (TDMA) techniques, Code Division Multiple Access (CDMA) techniques, and/or Integrated Digital Enhanced Network (iDEN) techniques.

The mobile device 10 can include embedded core software 32 for managing and allocating resources including memory, processor time, input/output mechanisms, peripheral devices, and the like. The core software 32 can include, but is not limited to, an operating system, device drivers, user interface software, connectivity routines, and the like. The core software 32 can include core table 22.

Additionally, the core software 32 can be stored as firmware in an Erasable Programmable Read-Only Memory (EPROM), a Programmable Read-Only Memory (PROM), or other Read-Only Memory (ROM). It should be noted, however, that the invention is not limited in this regard and that the core software 32 can be contained within integrated circuitry of the mobile device 10 in any fashion.

The mobile device 10 can also include a memory 30 that can be physically located within the same hardware as the core software 32 or may be located within a physically distinct memory space.

The memory 30 can include one or more string associative packs 15. When multiple string associative packs 15 are included within memory 30, events can trigger the selective activation of a particular one of the string associative packs 15. Further, a triggering condition can cause a new string associative pack 15 not previously including in the memory 30 to be wirelessly loaded. Further, string associative packs 15 included in memory 30 can be updated over the air, whenever a provider of the string associative pack 15 reconfigures the content of the string associative pack 15.

For example, different string associative packs 15 can correspond to different users of the mobile device 10. In such an example, when a user logs onto the mobile device 10, the associated string associative pack 15 associated with the user can be automatically activated. In another example, different string associative packs 15 can correspond to different carriers providing service for the mobile device 10 so that when a carrier changes the string associative pack 15 used by the mobile device 10 changes. In still another example, different string associative packs 15 can exist for different geographical locations. For instance, a large entertainment park like Disneyland can have a park-specific string associative pack 15 that is used by the mobile device 10, whenever the mobile device 10 is used within designated geographical boundaries.

Each string associative pack 15 can correspond to at least one string associative table 20. Entries within the string associative table 20 can be externally modifiable, where externally modifiable refers to being able to be changed without replacing hardware. For example, the entries within the string associative table 20 can be updated wirelessly or through an interface port of the mobile device 10. Access restrictions can be imposed so that the population authorized to update the string associative table 20 is restricted. For example, the string associative table 20 can be carrier updatable, administrator updatable, user updatable, and the like.

In one embodiment, the memory 30 can be a nonvolatile memory, such as a solid-state semiconductor memory, a magnetic disk, an optical disk, and any other recording medium. More specifically, the memory 30 can include, but is not limited to, a flash memory, an Erasable Programmable Read-Only Memory (EPROM), a hard drive, and the like. In another embodiment, the memory 30 can be a volatile memory, such as random access memory (RAM) that can be loaded upon power-up of the mobile device 10 from an external source. One such external source can be a data repository of a carrier servicing the mobile device 10.

In a particular embodiment, the memory 30 can include one or more computer programs for performing operations involving the string associative table 20. Moreover, computer programs within the memory 30 can use execute in-place (XIP) technologies to reduce overhead required of mobile device 10 resources external to the memory 30.

The core table 22 and the string associative table 20 can each store one or more records, each record having a request identifier field and an associated string field. The request identifier field can be a key field that the core software 32 of the mobile device 10 uses to indicate an occurrence of an operating system event. The string field can be a user-friendly representation of the key field. That is, a string stored in the string field can be presented upon the mobile device 10 as text 50. For example, the string field can include, but is not limited to, such strings as "dispatch," "contacts," "dialing," "power off," "options," "camera," "games," "Web," "settings," "call history," and the like.

The request identifier field and the string field can be stored as a number of different data types like string, counter, integer, and the like. Further, the request identifier and string field can utilize a variety of different file formats including, but not limited to, binary format, hex format, Intel hex format, Motorola Sxx format, FPC format, Signetics format, Tektronix format, EMON52 format, and the like. Moreover, the request identifier field and the string field can be different data types and can use different file formats. For example, the request identifier field can be represented as a 4-byte numeric identifier (commonly utilized for this purpose within many conventional mobile devices) and the string field can be represented as a string in an S Record format, such as the Motorola s19 format.

It should be noted that the string associative table 20 and the core table 22 are not limited to tabular data structures, but can each be any data structure in which rows of data having at least two related fields can be stored. Further, the accessing and storing of data within the string associative table 20 and the core table 22 can utilize any information retention technique including a file-based storage technique and/or a database storage technique.

The string associative table 20 can represent a modifiable region for defining strings. Entries within the string associative table 20 can be duplicative of entries within the core table 22, where when entries in the string associative table 20 override entries within the core table 22 for string lookup purposes whenever entries having the same request identifier exist within the string associative table 20 and the core table 20. Accordingly, strings can be customized upon the mobile device 10 without modifying the core software 32.

By way of illustration, a string request 42 can be generated by the mobile device 10. The string request 42 can include a request identifier that is to be converted into a string. The string associative table 20 in memory 30 can be initially searched for an entry that matches the request identifier. When a match is found, a corresponding string 40 can be conveyed to the mobile device 10. When no match is found, the core table 22 can be searched for a matching string. A matched string 40 can then be conveyed to the mobile device 10. Once the string 40 is determined, the mobile device 10 can apply formatting rules to the string 40 and responsively present the string 40 as text 50. Accordingly, text 50 can be formatted in accordance to any scheme defined for the mobile device 10, thereby causing the presentation format to be independent of the string 40 content. For example, when a style and/or theme is established for the mobile device 10, the text 50 can be formatted in accordance with the established style and/or theme.

It should be appreciated, that different carriers often like to present carrier-specific strings to users for branding purposes. For example, a carrier primarily servicing business professionals may prefer to present users with strings that are linguistically conservative. Another carrier that primarily services youthful clients and/or a niche market may prefer strings written in an avant-garde style. Further, users and value added resellers can also prefer to customize the strings presented upon the mobile device 10 to suit individual preferences. The string associative table 20 can be utilized in the manner detailed in system 100 to satisfy the string customization desires of each of these parties.

Figure 2:
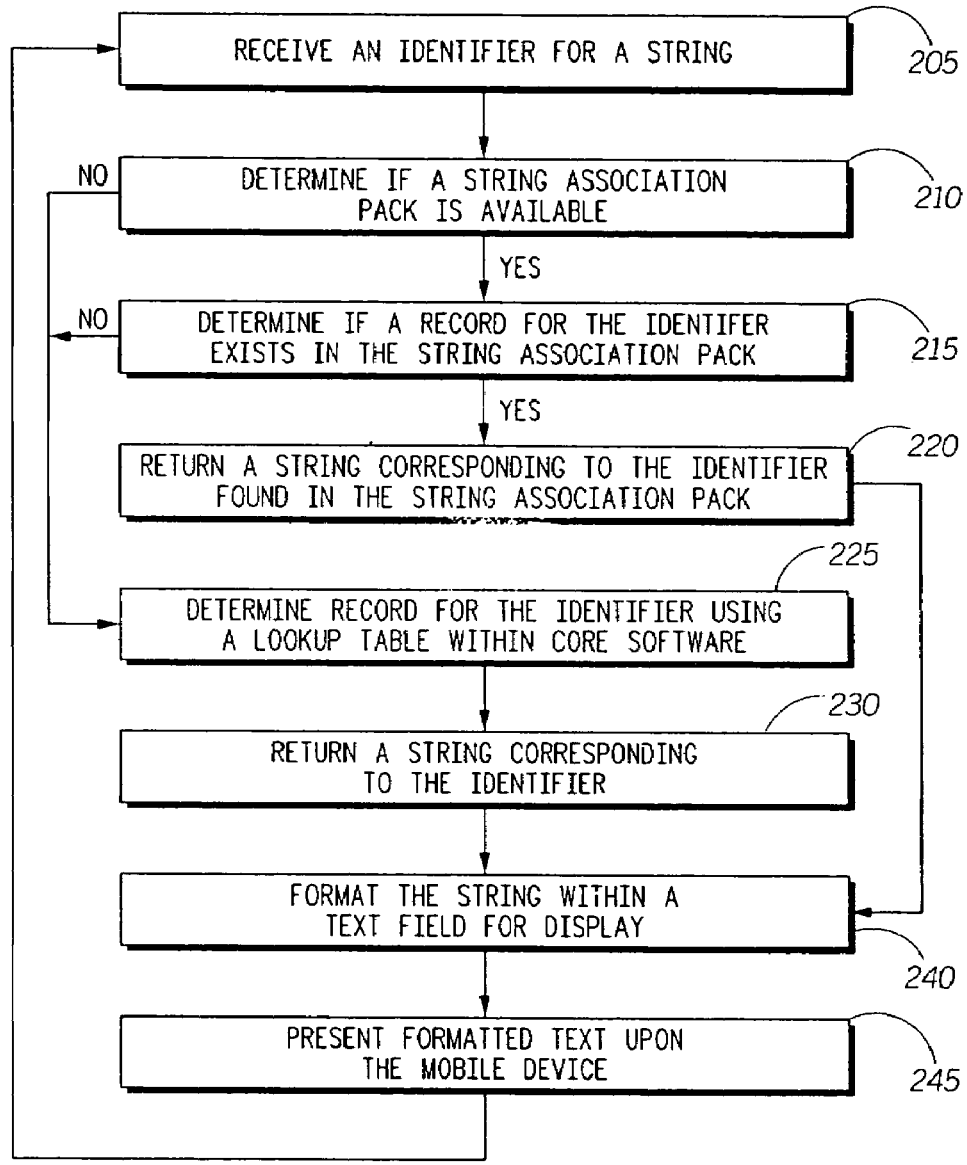
FIG. 2 is a flow chart illustrating a method for presenting text upon a mobile device in accordance with an embodiment of the inventive arrangements presented herein.

FIG. 2 is a flow chart illustrating a method 200 for presenting text upon a mobile device in accordance with an embodiment of the inventive arrangements presented herein. In one embodiment, the method 200 can be performed in the context of the system 100 of FIG. 1. The method 200, however, is not limited in this regard and can be utilized in the context of any mobile device that presents strings upon a display.

The method 200 can begin in step 205, where an identifier for a string can be received. In step 210, a determination can be made as to whether a string association pack is available. The string association pack can be a data packet loaded in an updatable memory of a mobile device by a carrier, user, or other party. In one embodiment, the string association pack can include the string association table 20 from FIG. 1.

When a string association pack is available, the method can proceed from step 210 to step 215, where the string association pack can be searched for an entry matching the identifier. In step 220, when a matching string is found, the matched string can be returned.

The method can proceed to step 225 when no string association pack was found in step 210 or when no string corresponding to the identifier is found in the string association pack during step 215. In step 225, a lookup table within the core software can be searched to determine if a record for the identifier exists. In one embodiment, the lookup table can be the core table 22 from FIG. 1. In step 230, when a record is found, a string corresponding to the identifier can be returned.

The method can proceed to step 240 when a string has been returned in either step 220 or step 230. In step 240, the string can populate a text field. The text field can be formatted in any fashion for display upon the mobile device. In step 245, the formatted text can be presented upon the mobile device. The method can then loop to step 205, where an identifier for another string can be received.

Figure 3:
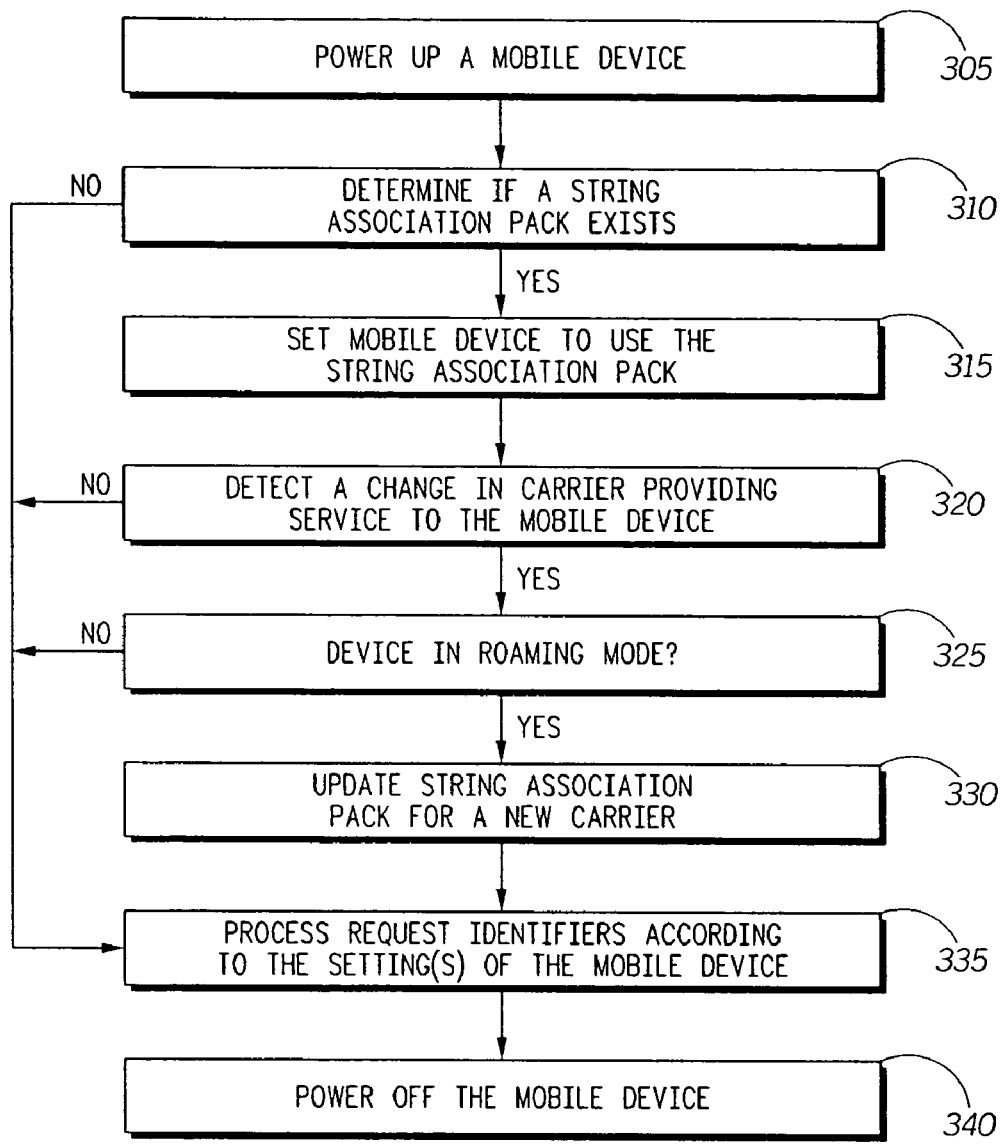
FIG. 3 is a flow chart illustrating a method for implementing customizable strings upon a mobile device without altering the core software of the device in accordance with an embodiment of the inventive arrangements disclosed herein.

FIG. 3 is a flow chart illustrating a method 300 for implementing customizable strings upon a mobile device without altering the core software of the device in accordance with an embodiment of the inventive arrangements disclosed herein. In one embodiment, the method 300 can be performed in the context of the system 100 of FIG. 1. The method 300, however, is not limited in this regard and can be utilized in the context of any mobile device that presents strings upon a display. In another embodiment, the processing of request identifiers shown in step 335 of FIG. 3 can be processed in accordance with method 200 of FIG. 2. The method 300, however, is not limited in this regard and request identifiers can be processed in any fashion.

The method 300 can begin in step 305, where a mobile device can be powered up. In step 310, a determination can be made as to whether a string association pack is available for use. As in FIG. 2, the string association pack can be a data packet loaded in an updatable memory of a mobile device by a carrier, user, or other party. If the string association pack is not available, the method can proceed to step 335, where request identifiers can be processed in accordance with the settings of the mobile device. Default settings used when no string association pack exists can process request identifiers using the core software of the mobile device alone.

When a string association pack exists, the method can proceed from step 310 to step 315, where the mobile device can be set to use the string association pack. In one embodiment, entries in the string association pack having the same request identifiers as entries in the core software can be preferentially used to determine string values. When no entries exist in the string association pack for a given request identifier, strings existing within the core software can be used to determine string values.

In step 320, a change in a carrier providing service to the mobile device can be detected causing the method to proceed to step 325. In step 325, the mobile device can be analyzed to see if the change of carrier has resulted in the mobile device being placed in a roaming mode. If the mobile device is placed in a roaming mode, the string association pack can be updated in accordance to strings provided by the new carrier. In this fashion, different carriers can brand strings displayed on the mobile device. In one arrangement, the update can occur wirelessly, over the air. If in step 325 the device is not placed in a roaming mode, the updating of the string association pack can be suppressed, causing the method to proceed directly to step 335.

In step 335, request identifiers can be processed according to settings of the mobile device. In step 340, the mobile device can be powered off. Notably, the string association pack can be stored within non-volatile memory, thereby retaining its current data even though the mobile device has been powered off. Accordingly, the updates to the string association pack can affect the operation of the mobile device when the device is next utilized.

The present invention can be realized in hardware, software, or a combination of hardware and software. A system according to an exemplary embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a)

conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for presenting text upon a mobile device comprising the steps of:
    establishing a string associative table within a mobile device, wherein the string associative table is remote from core software embedded within the mobile device;
    searching the string associative table for a request identifier that identifies text to be presented upon the mobile device;
    when said searching step finds the request identifier in the string associative table, identifying an identified string within the string associative table corresponding to the request identifier and presenting the identified string upon the mobile device; and
    when the searching step fails to locate the request identifier in the string associative table, finding a found string corresponding to the request identifier within a core table and presenting the found string upon the mobile device, wherein the core software includes the core table.

2. The method of claim 1, further comprising the steps of:
    said mobile device automatically detecting a different carrier servicing the mobile device; and
    responsive to the detection, updating strings of the string associative table to conform to conventions established by the different carrier.

3. The method of claim 2, further comprising the step of: suppressing the updating of the string associative table when the mobile device is in a roaming mode.

4. The method of claim 1, wherein each string in the string associative table indicates an occurrence of an event within an operating system of the mobile device.

5. The method of claim 1, wherein each string in the string associative table corresponds to a string contained within the core table.

6. The method of claim 1, wherein the string associative table is carrier modifiable, and wherein the core table is not carrier modifiable, wherein modifiable refers to being able to be changed without replacing hardware.

7. The method of claim 1, wherein the string associative table is user modifiable and the core table is not user modifiable, wherein modifiable refers to being able to change without replacing hardware.

8. The method of claim 1, said method further comprising the step of:
    formatting the string corresponding to the request identifier in accordance with a formatting scheme before the string is presented upon the mobile device, wherein the formatting scheme is independent of the string associative table and the core table.

9. The method of claim 8, where the formatting scheme is defined by at least one of a style and theme established for the mobile device.

10. The method of claim 1, further comprising the steps of:
    checking for the existence of the string associative table; and
    responsive to a positive result of said checking step, setting the mobile device so that the searching and identifying steps are performed whenever the mobile device is to display a string corresponding to a request identifier, wherein the mobile device is otherwise set to find strings using the core table alone.

11. The method of claim 10, wherein said checking step is performed when the mobile device powers up.

12. The method of claim 1, wherein the string associative table is stored within a flash memory.

13. The method of claim 12, wherein said searching and identifying steps are performed by execute in-place (XIP) computer programs residing in the flash memory.

14. A machine-readable storage having stored thereon, a computer program having a plurality of code sections, the code sections executable by a machine for causing the machine to:
    search a string associative table for a request identifier that identifies text to be presented upon a mobile device, wherein the string associative table is remote from core software embedded within the mobile device, and wherein the core software includes a core table;
    identify a string within the string associative table corresponding to the request identifier and present the identified string upon the mobile device whenever said search finds the request identifier in the string associative table; and
    find a string corresponding to the request identifier within the core table and present the found string upon the mobile device whenever said search fails to locate the request identifier in the string associative table.

15. The machine-readable storage of claim 14, the machine-readable storage further including code sections for causing the machine to:
    format the string corresponding to the request identifier in accordance with a formatting scheme before the string is presented upon the mobile device, wherein the formatting scheme is independent of the string associative table and the core table.

16. The machine-readable storage of claim 14, the machine-readable storage further including code sections for causing the machine to:
    check for the existence of the string associative table; and
    responsive to a positive result of said check, set the mobile device so that the searching and identifying steps are performed whenever the mobile device is to display a string corresponding to a request identifier, wherein the mobile device is otherwise set to find strings using the core table alone.

17. The machine-readable storage of claim 14, wherein the string associative table is stored within a flash memory, wherein the machine-readable storage searches and identifies the string in the string associative table using execute in-place (XIP) computer programs residing in the flash memory.

18. The machine-readable storage of claim 14, the machine-readable storage further including code sections for causing the machine to:
   automatically detect a different carriers servicing the mobile device; and
   responsively updating strings of the string associative table to conform to conventions established by the different carrier.

19. A system for presenting strings upon a mobile device comprising:
   a memory configured to store at least one string associative table that is configured to be wirelessly updatable; and
   core software embedded within the mobile device that includes at least one core table, wherein the string associative table and the core table associate a plurality of request identifiers with a plurality of strings to be presented upon the mobile device, and wherein the request identifiers are used by an operating system to indicate event occurrences, wherein entries in the string associative table override entries within the core table for string lookup purposes whenever a same request identifier exists within the string associative table and the core table.

20. The system of claim 19, wherein the string associative table is configured to be modified by carriers to customize strings for branding purposes.

21. The system of claim 19, wherein the memory is a flash memory.

22. The system of claim 19, wherein said memory stores a plurality of string associative tables that are selectively activated.

23. The system of claim 22, wherein the selective activation of one of said plurality of string associative tables is based upon an identity of a user of the mobile device, whereby at least one of the string associative tables includes user specific entries.

24. The system of claim 22, wherein the selective activation of one of said plurality of string associative tables is based upon a geographic location of the mobile device.

25. The system of claim 22, wherein the selective activation of one of said plurality of string associative tables is based upon a carrier network servicing the mobile device.

* * * * *